United States Patent
Tenyakov

(10) Patent No.: US 7,399,923 B2
(45) Date of Patent: Jul. 15, 2008

(54) ELECTRICAL HERMETIC PENETRANT STRUCTURE OF LOW VOLTAGE

(75) Inventor: Aleksei Yuryevich Tenyakov, Moscow (RU)

(73) Assignee: Zakrytoe Aktsionernoe Obshchestvo "Elox-Prom", Moscow (RU)

( * ) Notice: Subject to any disclaimer, the term of this patent is extended or adjusted under 35 U.S.C. 154(b) by 0 days.

(21) Appl. No.: 11/552,146

(22) Filed: Oct. 24, 2006

(65) Prior Publication Data

US 2007/0039752 A1   Feb. 22, 2007

Related U.S. Application Data

(63) Continuation of application No. PCT/RU2005/000300, filed on Jun. 2, 2005.

(30) Foreign Application Priority Data

Feb. 17, 2005   (RU) ............................... 2005104294

(51) Int. Cl.
*H02G 15/02* (2006.01)
(52) U.S. Cl. ................. 174/74 R; 174/77 R; 174/84 R; 174/88 R
(58) Field of Classification Search ............... 174/74 R, 174/74 A, 77 R, 80, 84 R, 84 S, 88 R, 88 S, 174/93

See application file for complete search history.

(56) References Cited

U.S. PATENT DOCUMENTS

| | | | |
|---|---|---|---|
| 3,601,526 A * | 8/1971 | Bohne et al. ................. 174/151 |
| 3,680,208 A * | 8/1972 | Bohne et al. ................... 29/825 |
| 3,780,204 A * | 12/1973 | Oliver et al. ............... 174/11 R |
| 3,801,722 A * | 4/1974 | Korner ..................... 174/11 R |
| 3,856,983 A * | 12/1974 | Fisher et al. ................. 174/151 |
| 3,998,515 A * | 12/1976 | Panek ......................... 439/198 |
| 4,041,240 A | 8/1977 | Sipowicz |
| 4,053,201 A * | 10/1977 | Grappe ........................ 439/589 |
| 4,356,344 A * | 10/1982 | Carey ....................... 174/50.56 |
| 4,425,476 A | 1/1984 | Kyle |
| 4,963,698 A | 10/1990 | Chang et al. |
| 4,984,973 A * | 1/1991 | Itameri-Kinter et al. ..... 417/422 |

(Continued)

FOREIGN PATENT DOCUMENTS

SU   1334246 A1   8/1987

(Continued)

OTHER PUBLICATIONS

International Search Report from International Application No. PCT/RU2005/000300, filed Jun. 2, 2005, mailed on Nov. 2, 2005.

(Continued)

*Primary Examiner*—William H Mayo, III
(74) *Attorney, Agent, or Firm*—Houston Eliseeva LLP

(57) ABSTRACT

A low voltage electrical hermetic penetrant structure which provides input of electrical energy and signals in tight premises, such as in atomic power stations, nuclear vessels, underground, and the like. The hermetic penetrant structure includes hermetic modules sealed relative to a surrounding case. A metal pipe of each hermetic module includes longitudinally pressurized wires hermetically sealed inside the metal pipe through polysulphone and polyetheretherketon insulators. The polyetheretherketon insulators are positioned at the end portions of the wires. On the ends of each module an additional external insulator can be installed in the form of a socket of thermal-shrinkage pipe, filled with fire-resistant sealant.

4 Claims, 1 Drawing Sheet

U.S. PATENT DOCUMENTS

| | | | | |
|---|---|---|---|---|
| 5,015,192 A * | 5/1991 | Welsh et al. | | 439/83 |
| 5,099,572 A * | 3/1992 | Lazaro, Jr. et al. | | 29/863 |
| 5,203,723 A * | 4/1993 | Ritter | | 439/589 |
| 5,278,357 A * | 1/1994 | Yamanashi | | 174/151 |
| 5,299,949 A * | 4/1994 | Fortin | | 439/275 |
| 5,387,119 A * | 2/1995 | Wood | | 439/281 |
| 5,485,673 A * | 1/1996 | Lau | | 29/883 |
| 5,518,415 A * | 5/1996 | Sano | | 439/204 |
| 5,535,512 A * | 7/1996 | Armogan | | 29/877 |
| 5,630,732 A * | 5/1997 | Yamanashi | | 439/589 |
| 5,733,145 A * | 3/1998 | Wood | | 439/604 |
| 5,797,761 A * | 8/1998 | Ring | | 439/320 |
| 5,823,811 A * | 10/1998 | Blanchfield et al. | | 439/274 |
| 6,582,251 B1 * | 6/2003 | Burke et al. | | 439/589 |
| 2002/0162476 A1 * | 11/2002 | Parker et al. | | 102/530 |
| 2005/0186823 A1 * | 8/2005 | Ring et al. | | 439/322 |
| 2005/0202720 A1 * | 9/2005 | Burke et al. | | 439/578 |
| 2007/0193464 A1 * | 8/2007 | Hironaka et al. | | 102/200 |

FOREIGN PATENT DOCUMENTS

SU          1760560 A1     9/1992

OTHER PUBLICATIONS

English Translation of USSR Patent No. SU 1334246, published Aug. 30, 1987.
English Translation of USSR Patent No. SU 1760560, published Sep. 7, 1992.
Schott, Catalogue No. 4835/1 d, published 1989.

* cited by examiner

ELECTRICAL HERMETIC PENETRANT STRUCTURE OF LOW VOLTAGE

RELATED APPLICATIONS

This application is a Continuation of PCT application serial number PCT/RU2005/000300 filed on Jun. 2, 2005, which in turn claims priority to Russian application serial number 2005104294 filed on Feb. 17, 2005, both of which are incorporated herein by reference in their entirety.

FIELD OF THE INVENTION

The invention concerns electrical hermetic penetrant structure of low voltage, used for input of electrical energy and signals into tight premises, for example, in atomic power stations, nuclear vessels, underground, etc.

BACKGROUND OF THE INVENTION

It is known as penetrant structure containing the case under pressure, wiring harness, gasket seal of wiring harness relative to the case. This design is unreliable since in places of gasket seal of wires relative to the case there is a break of insulation which is humidified while in service, that results to failure of penetrant structure (see SCHOTT catalogue No. 4835/1d the publication of 1989).

The most similar on technical essence to the described invention is electrical hermetic penetrant structure containing the case under pressure, the hermetic modules sealed relative to the case, the hermetically sealed wires pressurized in a metal pipe of each module through polysulphone insulators (see the patent of the U.S. Pat. No. 3,601,526, H01B17/26, 1971).

The known design possesses the lowered thermal stability and fire resistance due to the following reasons: polysulphone is used as a sealing material for wires relative to modules. This material has temperature of a softening 168° C., and emergency operation at nuclear stations stipulate long operation of penetrant structure at temperatures up to 250° C. and pressure of 7-9 Bar. Polysulphone simply flow out under the influence of a fire, thus there is a loss of tightness and breakdown of electric insulation.

SUMMARY OF THE INVENTION

Objective of this invention is creation of such electrical penetrant structure that would keep operational properties at the increased temperature and influence of open fire.

The task in view is solved in the following way. Electric hermetic penetrant structure, containing the case under pressure, the hermetic modules sealed relative to the case, the hermetically sealed wires, pressurized in a metal pipe of each module through polysulphone insulators, has at least in one of the ends of each module insulators of polyetheretherketon behind the polysulphone insulators. On these ends of each module the additional external insulator can be installed. This insulator is made in the form of a socket of thermo-shrinkage pipe filled by fire-resistant sealant.

Thermo-shrinkage pipe is preferably made of high-molecular organic-silicon compound modified for providing of thermo-shrinkage effect, and one-component low-molecular nonflammable silicone on a basis of silicon-polymer vulcanized by air moisture is used as a sealant.

Each wire of the penetrant structure can be placed in a tube of a high-molecular organic-silicon compound modified for providing of thermo-shrinkage effect, and the first part of this tube is pressurized in a socket.

BRIEF DESCRIPTION OF THE DRAWINGS

The essence of the invention is explained by the drawing, where the longitudinal section of the penetrant structure is shown in FIG. 1, and the longitudinal section of an end surface of the penetrant structure is shown in FIG. 2.

DETAILED DESCRIPTION OF THE PREFERRED EMBODIMENTS

Figure 1:
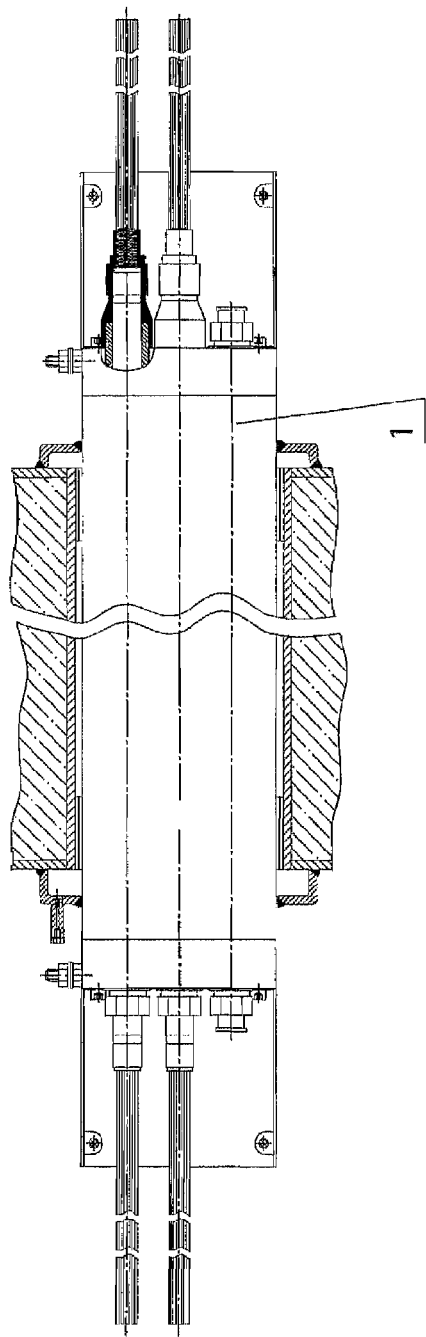
Figure 2:
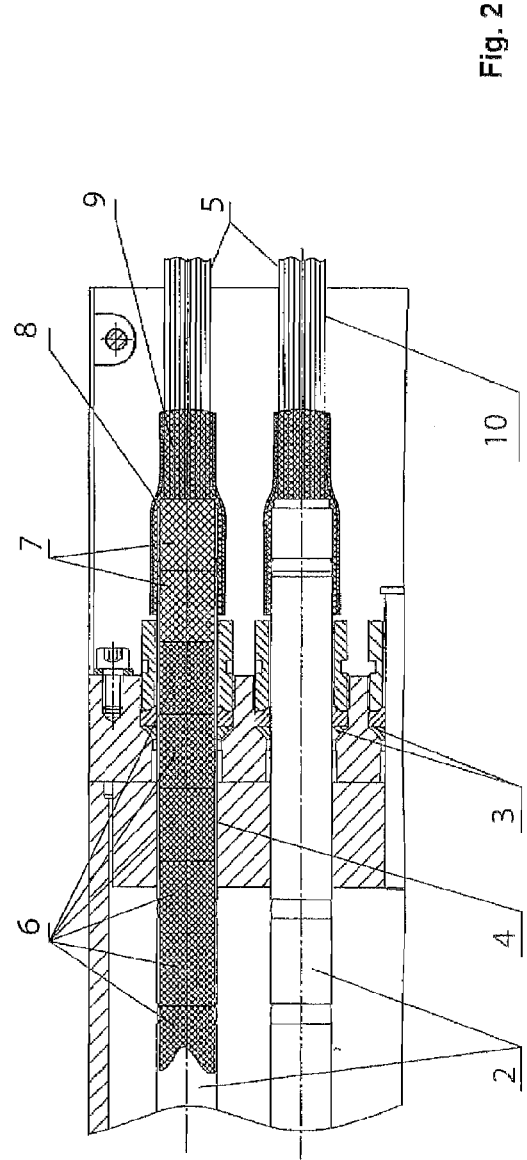

The electrical hermetic penetrant structure consists of case 1 which is under the pressure through which pass tight electric modules 2 sealed in flanges of the case with the help of radial gaskets 3. The hermetic electrical modules consist of metal pipe 4 and longitudinal-hermetically sealed insulated wires 5. Wires 5 are hermetically sealed relative to a pipe by means of polysulphone insulators 6, and on the end of a pipe—by less plastic, but more heat-resistant insulator 7 of polyetheretherketon, for example, KETRON PEEK 1000 or KETRON PEEK GF30. To avoid flowing out of polymeric insulators under the influence of fire, trailer sockets 8 in the form of thermo-shrinkage pipe are installed on the end of modules. They are made, for example, of such material as TRS (Gremco, France), filled with fireproof sealant 9, for example, elastic-seal (Wakker, Germany). The specified materials under the influence of fire do not evolve electric-conductive gums and keep the shape after long influence of fire.

To provide an additional electric insulation between wires in a zone of trailer socket at influence of open fire, thermo-shrinkage tubes 10 are mounted on each wire. These tubes are made of TRS material (Gremco, France), and fireproof covers of an inorganic material (silicon-boride glass or a quartz string).

The described penetrant structure keeps operational properties under the raised temperatures and influence of open fire because of additional insulator. At least one such insulator is installed additionally to polysulphone insulators at the end surface of the module. This insulator is made of the material which keeps elastic properties under emergency operation (polyetheretherketon, which has allowable temperature of operation 3400° C.). Thus polysulphone insulators keep excellent tightness, and additional isolators prevent flowing out or expression of polysulphone under emergency operational conditions.

In order to provide the fire resistance on the end surface of the modules it is possible to mount additional trailer socket of thermo-shrinkage pipe filled with fire-resistant sealant, and to mount chemically proof tubes onto the wires by means of thermal method. These tubes do not evolve electric-conductive gums under the influence of open fire and the nonflammable products contained in them keep the shape after the influence of a fire.

What is claimed is:

1. An electrical hermetic penetrant structure comprising:
   a case under pressure; and
   at least one hermetic module sealed relative to the case, the at least one hermetic module comprising:
   a metal pipe comprising:
   at least one hermetically sealed wire longitudinally pressurized inside the metal pipe;
   at least one polysulphone insulator hermetically sealing at least one hermetically sealed wire inside the metal pipe; and behind the polysulphone insulator at least one polyetheretherketon insulator hermetically sealing at least one of the ends of each metal pipe.

2. The electrical hermetic penetrant structure according to claim 1, wherein an additional external insulator is installed at the ends of the at least one hermetic module in the form of a thermo-shrinkage pipe socket, filled with a fire-resistant sealant.

3. The electrical hermetic penetrant structure according to claim 2, wherein said thermo-shrinkage pipe is made from a high-molecular organic-silicon compound, modified for providing a thermo-shrinkage effect, and one-component low-molecular nonflammable silicone on a basis of silicon polymer is used as the sealant.

4. The electrical hermetic penetrant structure according to claim 3, wherein the at least one hermetically sealed wire of the penetrant structure is placed in a tube made from a high-molecular organic-silicon compound modified for providing the thermo-shrinkage effect, and wherein at least one end of the tube is pressurized in a socket.

* * * * *

UNITED STATES PATENT AND TRADEMARK OFFICE
CERTIFICATE OF CORRECTION

PATENT NO. : 7,399,923 B2  
APPLICATION NO. : 11/552146  
DATED : July 15, 2008  
INVENTOR(S) : Aleksei Y. Tenyakov Page 1 of 1

It is certified that error appears in the above-identified patent and that said Letters Patent is hereby corrected as shown below:

In column 2, line 44, change "3400º C" to --340º C--.

Signed and Sealed this

Thirtieth Day of September, 2008

JON W. DUDAS  
*Director of the United States Patent and Trademark Office*